June 14, 1938.  L. J. ORVIN  2,120,765
INFRARED RAY VIEWING MEANS
Filed May 28, 1935  2 Sheets-Sheet 1
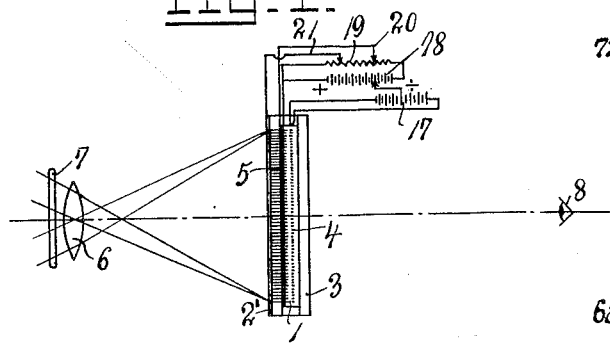
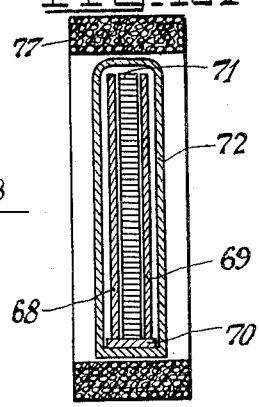
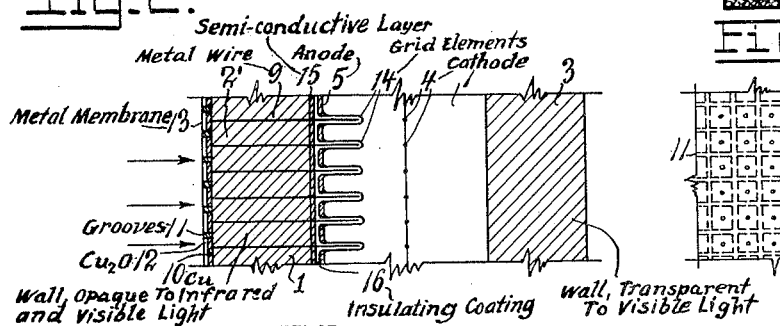
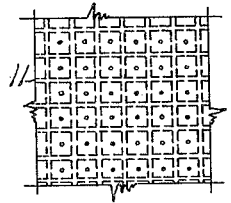
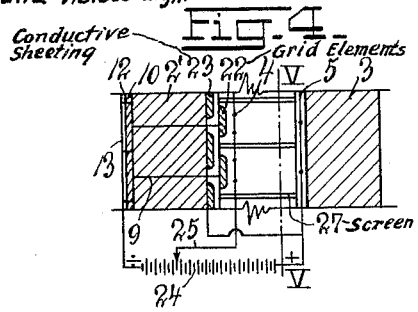
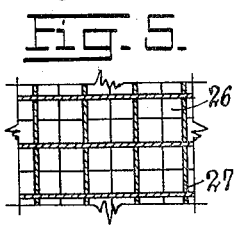
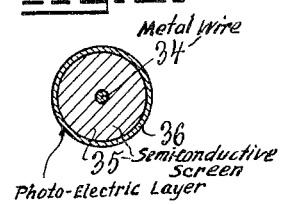
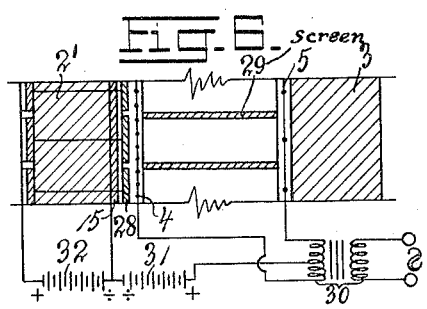
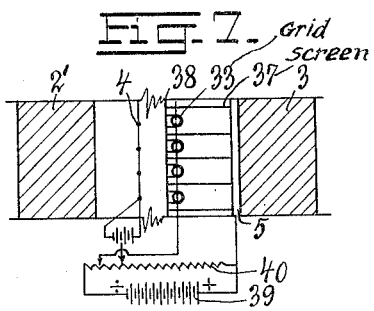
L. J. Orvin
Inventor
By: Glascock Downing Seebold
Attys.

June 14, 1938.  L. J. ORVIN  2,120,765
INFRARED RAY VIEWING MEANS
Filed May 28, 1935   2 Sheets-Sheet 2
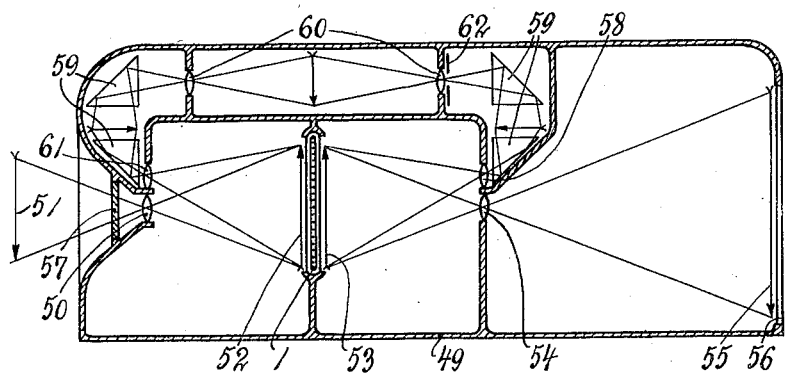
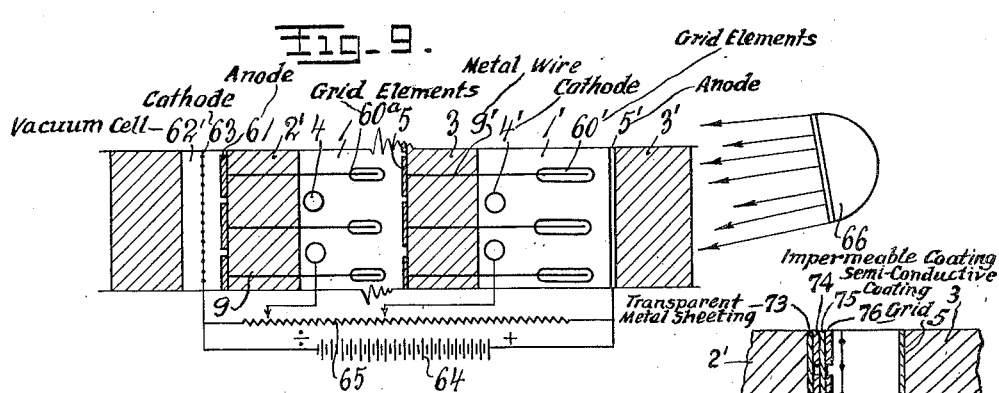
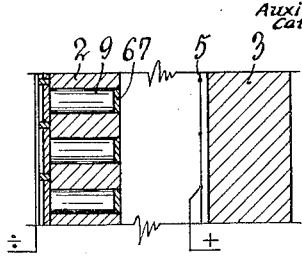
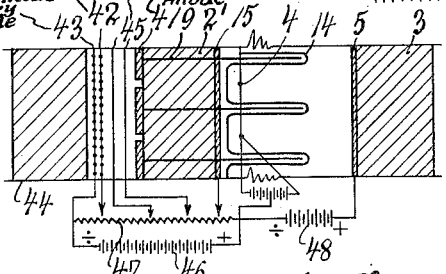
L. J. Orvin
Inventor
By Glascock Downing & Seebold
Attys.

Patented June 14, 1938

2,120,765

UNITED STATES PATENT OFFICE 2,120,765

INFRARED RAY VIEWING MEANS

Lars Jörgen Orvin, Oslo, Norway

Application May 28, 1935, Serial No. 23,931
In Norway May 31, 1934

22 Claims. (Cl. 250—1)

The invention concerns an appliance by means of which objects can be viewed, even in cases where none of the visible rays emitted by them, but only infra-red rays, reach the point of observation. The appliance is especially suitable for ships and aeroplanes, since by its aid it will be possible to obtain a visible picture of distant objects, for instance, other ships, coasts and the like, in dense fog. Such features are possible since infra-red rays are known to have the property of being able to penetrate through a fog without being absorbed or dispersed to any material extent.

The subject matter of the invention relates to an appliance comprising an electric discharge-chamber provided with electrodes. Between the electrodes there takes place a discharge, which is controlled by a picture, which by suitable means is thrown against one side of the discharge container and produces a secondary picture in the discharge-chamber, which picture can be viewed from the other side of the appliance.

The principal object of the invention is to provide an appliance, by means of which there can be obtained a visible secondary picture with clear outline and well-defined contrasts, corresponding to an invisible infra-red picture, which by aid of a lens or system of lenses is thrown upon one side of the discharge-container.

One important feature according to the invention lies in the fact that the infra-red picture is thrown upon a layer sensitive to infra-red rays, which layer is protected against diffuse reflex irradiation from the visible picture.

Another important feature in an appliance constructed according to the invention consists in the arrangement in the discharge-chamber of an electrode which acts as a grid and serves to control the discharge between the cathode and the anode, so as to correspond to the invisible infra-red picture.

In one constructional form of the invention, the grid and the photo-electric layer sensitive to infra-red rays are separated from each other and are electrically in connection with each other, so that the different points of the grid obtain potentials corresponding to the intensity of light of the corresponding point in the invisible picture.

The connection between the light-sensitive layer and the grid can be conveniently effected by means of wires arranged as a grating.

In another form, the current-connection is effected by a semi-conductive coating.

According to the invention the visible picture can be produced in a fluorescent layer on the anode. In this case the cathode may be made as a hot-cathode or be coated with a substance which gives off electrons on being irradiated conveniently from a source of infra-red rays. With this form of execution direct current is preferably employed.

The visible picture can also be formed in a glow-light layer, the cathode being coated with a substance which reduces the cathode-fall. In this form of execution there is preferably employed alternating current or pulsating direct current, the half-tones of the pictures being produced in the manner that the intervals between the gleams of glow-light are varied in accordance with the intensity of irradiation for the different points in the infra-red picture.

The invention comprises special devices, such as a partition or a screen between the fluorescent layer, in which the picture is formed, and the light-sensitive layer, serving to prevent the diffuse irradiation of the light-sensitive layer from the visible picture. This screen may be formed in such manner that there is attained a directed reflex irradiation of the light-sensitive layer from the visible picture.

The invention further comprises devices for obtaining an intensification of the visible picture produced. The intensification can be brought about by an optical reaction, by which the individual points or surface elements of the light-sensitive layer are directly or indirectly irradiated by light from the corresponding surface elements in the visible picture.

The intensification can also be obtained by electrical means, with use of a photo-electric cell (gas-filled or vacuum), one electrode of which is formed by the light-sensitive layer on which the infra-red picture is thrown, in the vicinity of which electrode are arranged auxiliary electrodes, serving for intensification of the stream of electrons emitted from the aforesaid light-sensitive electrode.

Further features and advantages of the invention will be seen from the following description in combination with the appended drawings, where:

Fig. 1 shows a diagrammatical section through one form of an appliance according to the invention.

Fig. 2 shows on a larger scale an interrupted section through the discharge-chamber of the appliance shown in Fig. 1.

Fig. 3 shows the left wall of the discharge-chamber in Fig. 2 viewed from the left.

Fig. 4 is a view similar to Fig. 2 illustrating a modification.

Fig. 5 is a section along the line V—V in Fig. 4.

Figs. 6, 7 and 9 show sections similar to Fig. 2 illustrating different forms of the discharge-chamber according to the invention.

Fig. 8 shows on a small scale a section through a complete appliance according to the invention.

Fig. 10 is a section through a discharge-container.

Fig. 11 is a view similar to Fig. 2 of another modification.

The forms of carrying out the invention shown comprise a discharge-chamber 1, with plane, parallel walls 2 or 2' and 3 of which the wall 3 must be transparent to visible light, whereby the first named wall in some cases must be impenetrable to infrared and visible light, being indicated by 2' and in other cases transparent at least to infrared rays being then indicated by 2 and likewise plane, parallel electrodes 4 and 5, which can be made in the form of wirenet, transparent membranes, layers or the like. By aid of a lens or system of lenses 6, before which there may be placed a filter 7 (see Fig. 1), an invisible infra-red picture is thrown upon one side of the apparatus. This picture is, in the discharge-chamber, caused to produce a visible picture, which is formed in a fluorescent layer on the fluorescent anode 5 of the chamber, or in a glow-light layer, the cathode of the chamber being in the latter case formed as a glow-cathode.

The above applies to all forms of execution. A common feature for all these forms is that they comprise a discharge chamber provided with flat parallel electrodes 4 and 5. In the forms of execution where direct current is used, 4 designates the cathode and 5 the anode. In the forms of execution with employment of alternating current, for instance, the execution according to Fig. 6, one electrode 4 is prepared in such manner that it will have a low cathode fall, while the cathode fall of the other electrode is high. The apparatus will in this case act as rectifier for the current, with the electrode 4 as effective cathode and the electrode 5 as effective anode. Thus in all forms of execution 4 indicates the electrode which acts as cathode and 5 the electrode acting as anode. The visible picture is either viewed direct from the other side of the chamber as indicated at 8 in Fig. 1, or is thrown by aid of a lens or system of lenses on enlarged or diminished scale upon a plate of frosted glass or the like (Fig. 10).

In Figs. 1, 2 and 3 there is illustrated a form of execution for an appliance according to the invention. In this form the left wall 2' of the discharge-chamber is made of a material impenetrable to visible and infra-red light, such as for example coloured glass, porcelain or the like, and is provided with a grating of thin wires 9 (of platinum for example), which is perpendicular to the plate and passes through it. On its left side, which is irradiated by infra-red rays, the plate is smooth and the ends of the wires lie in the plane of the surface and contact a photoelectric layer, sensitive to infra-red rays and divided up in the form of a grating. In the here-described form of execution it has been thought to make this layer as an intercepting layer of copper protoxide, but other types of cells can, of course, be used. The grating of cells can, for instance, be executed in such manner that on the left side of the plate 2' there is provided a copper sheeting 10, in electrical connection with all the wire-ends. This sheeting is formed by a grooving-machine (in combination with etching) divided into squares corresponding in number to the wires, and the small grooves 11 between the squares are filled with a substance of high insulation value, which must stand being heated during the subsequent treatment. Thereafter the sheeting is oxidized, for instance, by heating, a thin layer 12 of copper protoxide, over which is spread, for example, by cathode pulverization, a very thin transparent metal membrane 13. Thus there is formed a common electrode for all the infra-red-sensitive miniature cells, which moreover are mutually insulated and each connected with a wire 9 passing through the plate 2'.

On the inner side of the plate 2', the wire-ends 14 project out from the surface of the plate in the manner shown in Fig. 2, and here form an electrode arrangement, having the form of a grating and acting as a grid.

The form of the grid-elements may be varied in many ways, and they may also be made to end in the plane of the plate as shown in Fig. 6, in which case they may be partially produced by electrolysis. The insulation layer shown in Fig. 2 over the grid-elements may be omitted in other forms of execution. On the inner side of the plate 2' a semi-conductive layer 15 is provided, which acts as a grid-leak-resistance. In order to attain an approximately homogeneous discharge from all the grid-elements, this layer is executed as regards extent and thickness outside the grating-field in such manner that the difference in resistance between the contact-edge of the layer and the different points of the grating is as small as possible. An entirely homogeneous discharge can be obtained by stretching between each line of the grating directly on the glass plate very thin wires before depositing the layer which wires may be connected to a point of fixed potential in a current circuit or source of current. In this case the resistance of the layer must be very high, the linear extent of the grid-leak resistance for each grid-element being only half of the distance between two lines on the grating. The layer can be deposited by electron-pulverization or evaporation in vacuum or can be deposited mechanically in the form of a powder, which is afterwards hardened by chemical means or by heating. Over the layer 15 and over the free wire-ends is arranged a thin insulating coating 16, for example, enamel, which must be able to stand the tension between the grid-grating and the resistance layer 15 on the one hand, and on the other hand the fluorescent anode 5, which is placed immediately over the insulation layer 16, on which fluorescent anode the visible picture is formed. The cathode is made as a reticular hot-cathode 4, formed of thin wires, oxidized or otherwise prepared, through which the picture is viewed. If the cathode is constructed of long, continuous wires, it should be heated by alternating current, and not—as diagrammatically shown in Fig. 1—by direct current from a battery 17. As the cathode need not be visibly incandescent, it will not in any appreciable degree interfere with the viewing of the picture. The fineness of the network and the distance from the grid-elements will, with respect to the action on the amplification system as well as to the length of the grid-wires, depend in part on the kind of cells used and on the available grid-voltage amplitude.

By means of a battery 18, the fluorescent anode 5 is given a positive potential. When the current flow therethrough, the fluorescent anode—provided that the grid-elements 14 are not negatively charged—will be caused to glow. If now by means of a sliding-contact 20 on the potentiometer 19 a negative potential is sent through the grid-resistance 15 on the grid-elements, the anode current will be weakened, and on adjusting the grid-potential to a sufficient height, the fluorescence will cease entirely. By means of a sliding-contact 21 on the potentiometer 19, the common electrode 13 for the intercepting layer can be given a positive potential. Assuming that the resistance of this layer, when not irradiated, is very high in proportion to the constant grid-resistance, no fluorescence will appear at first. If, however, the intercepting layers 10, 12 are irradiated by active rays of varying intensity, the grid-elements will adjust themselves to different potentials, answering to the irradiation intensity of the corresponding cell-elements and thereby cause the influorescent anode to glow at the corresponding points. If a total picture of infra-red (or visible) rays which act on the cells is thrown upon the network of cells, it will be reproduced visibly and in all half-tones in the emission-colour characteristic for the fluorescent substance employed. On transferring the grid-cell tension over the layer 15 and the external common electrode 13 of the network of cells, provided the cells are of such character as to admit of such transference (for instance, selenium), the picture will come out as negative.

As fluorescent material may be employed willemite (zinc silicate), zinc sulphide, calcium wolframate or other known substances or a combination of two complementary luminous substances, such as zinc silicate and calcium wolframate.

Instead of placing the fluorescent anode on the inside of the wall 2, it can also be arranged on the inside of the wall 3, the hot cathode being in such case placed on the grid side between the grid-elements 14. This form of execution has the advantage that the picture is not interfered with by the grid-grating and the cathode, which remain behind the picture when it is being viewed. At the same time the voltage is reduced over the insulation layer 16, which moreover, provided the filaments of the hot cathode are accurately adjusted, can be omitted in this form of execution. In this construction, the electrons emitted from the cathode will be acted upon both by the grid elements and by the grid-leak layer 15. In order to bring about effective control of the discharge, the grid elements must be given a high negative preliminary voltage, that is, the grid-leak layer 15 must be given a high negative potential. As the potential for the grid leak layer 15 is constant and exerts a constant action on the electrons emitted from the hot cathode, this will diminish the effect of the alterations in the grid potentials. In order to reduce the injurious influence of the grid layer there can on the inside of the insulation layer 16, at the point where the anode 5 is situated in the form of execution according to Fig. 2, be placed a conducting layer, which is given a definite suitable potential. This layer will protect the electrons emitted from the hot cathode against the action of the grid leak layer, but will of course, itself exert a certain degree of influence on the discharge. However, as the potential for the conducting layer can be chosen at will, it will be possible by adopting a suitable potential to reduce the effect of this layer to a minimum.

Instead of employing a grid-resistance layer there can be arranged upon the grid an infrared-sensitive coating, so that the grid-discharge goes through the ionized gas or vacuum by photoelectric liberation. This liberation can, for instance, take place by aid of the infra-red irradiation from the hot cathode, which is adjusted to suitable incandescence by means, for example, of a regular glow-light resistance or from another source of rays.

Instead of employing a hot cathode, there can be used a photo-electric emittent infra-red-sensitive cathode, either in the form of a deposited layer or in the form of a wire-netting or the like. The electron-liberation can conveniently take place by aid of a source of infra-red rays, so placed that its invisible rays, in case the fluorescent layer is placed on the inside of the wall 3, go through the layer which in such case ought to be least possible absorbent for infra-red light. The advantages of this arrangement are that the current-arrangement is simplified and heating of the apparatus is diminished. The source of rays may be at the same time used for releasing the grid-current and can conveniently be given the form of an edging, running around the image-field and have a parabolic cross-section, in the focus-line of which the hot cathode is placed.

As already mentioned, the visible picture can be formed by means of a glow light discharge instead of on a fluorescent screen, and in this case there is used in place of the fluorescent anode a cathode adapted to produce a glow-light discharge, being preferably provided with a coating of a substance reducing the cathode fall, for example, with $Cs_2O$, Cs, K, Na, Rb or compounds of these substances, the grids being given any suitable form and sometimes coated with a similar substance, so that the grid-discharge can proceed through the gas, which may be neon, argon, helium or other gases or mixtures. The anode may be made as a thin wire network. The form of execution described in connection with Figs. 1, 2 and 3 for an appliance in accordance with the invention may also be operated with pulsating continuous current or alternating current in the anode circuit, the apparatus in such case acting as a current-rectifier and utilizing one phase. If the picture is formed by means of a glow light discharge, the use of pulsating direct current or alternating current will in most cases be of advantage as regards the half-tones in the picture. Meanwhile, direct current can also be employed where the picture is formed by means of a glow light discharge. Such a form of execution is shown in Fig. 4. In this case, the left wall 2' of the discharge-chamber is made in the main like the grating-plate 2 in Fig. 2, there being arranged on the left side of the plate an intercepting screen and network of cells, of which the separate elements are electrically connected with wires 9, passing through the plate 2'. The grid is made in the form of a conductive sheeting 22, divided up like a grating, on the inner side of the wall 2'. Under the grid 22 is placed a conductive sheeting 23, which can conveniently be given a regulatable voltage, preferably approximate to the anode potential. 24 is a source of direct current, the negative pole of which is connected with the common cell-electrode 13, while the positive pole is connected with the net-shaped anode 5 in the discharge-chamber. The cathode 4 in this chamber is made as a cathode adapted to produce a glow light discharge, being preferably provided with a coating of a substance reducing the cathode fall and can by aid of the sliding-contact 25 be given a suitable voltage in relation to the anode. Between the walls of the chamber is placed a screen 27, provided with openings 26, arranged as a grating, which serve to prevent the ionization from spreading. In Fig. 5 is shown the arrangement of the canal-formed openings in the screen 27.

The mode of operation of this appliance is as follows:

Between the cathode 4 and the anode 5 there is produced a voltage which lies under the extinguishing voltage for the glow-discharge. The common electrode 13 of the cell-grating is given a voltage in relation to the anode which lies above the ignition voltage of the glow-discharge. When the cell-grating 10, 12 is irradiated, it becomes conductive and the grid 22 becomes negatively charged with a speed corresponding to the intensity of irradiation of the corresponding cell-element. The layer 23 acts, as has been said, as a charge-condenser in connection with the grid 22. During the charging of the grid, the voltage-fall in the discharge-chamber will increase and approach the ignition voltage, and finally there will occur a glow-discharge, which lasts until the condenser-element has lost its charge. In this form of execution, the half-tones in the visible picture are produced by the varying of the intervals of time between the gleams of glow-light in accordance with the intensity of irradiation of the corresponding cell-element.

In Fig. 6 there is shown another form of execution, where the visible picture is likewise formed in a glow-light layer, but where the half-tones are produced in such a manner that the moments of ignition are for each current inrush altered in accordance with the grid potentials, alternating current or intermittent direct current being employed.

The plate 2' is made in similar manner to the plate 2 in Fig. 2, except that the grid is constructed as a layer 28, divided as a grating. Between the cathode 4 and the anode 5, which may consist of thin wire network, there is, as in Fig. 2, arranged a grooved grating 29, which serves to prevent spreading of the ionization. The cathode wires may extend through the walls of the grating and are borne by it, while the grid may be made in the same way as in Fig. 2 and project into the grooves. The cathode and anode are attached each to its own end of the secondary windings of a transformer 30, while the grid-leak layer and the intercepting layer are by the direct current sources 31 and 32 given suitable initial voltages in relation to the zero-point of the transformer. The grid-leak layer can also be connected with another point on the transformer via a variable condenser, so that the basal potential of the grids can be phase-displaced towards the anode voltage and the strength of the light be thereby regulated.

As the cathode 4 is either coated with a substance reducing the cathode fall or is made as a hot cathode, while the anode 5 has a high cathode fall, an alternating current conveyed to the electrodes will be rectified, so that the electrons will flow from the cathode 4 to the anode 5 but not in the reverse direction. Thus, a pulsating continuous current will flow through the apparatus. The flashes of light produced by these current inrushes in the attenuated gas will, owing to the slow action of the eye, be perceived as a continuous beam of light. If now an image is thrown on the cell-grating on the outside of the plate 2', the potentials of the grids 28 will in the same manner as previously described adjust themselves in accordance with the intensity of irradiation of the corresponding cell-element and will for the corresponding image-element determine the moments at which the flashes are produced by the individual current inrushes, so that the duration of the flash produced will be dependent on the intensity of irradiation of the corresponding image-element in the infra-red picture. In this way the half-tones in the visible picture are obtained.

Thus the mode of action as regards the individual elements is analogous with the functioning of the known grid-controlled glow-light or luminous arc relays. The picture as a whole will, similarly to the cinematograph pictures, be formed by a definite number of flashes per second, while the duration of the separate flashes will for each image-element be dependent on the infra-red irradiation on the corresponding point in the infra-red picture.

The most favourable form of curve for the anode tension in the individual current inrushes will be the rectangular and not the sinus form.

The form shown in Fig. 6 can be simplified by placing the infra-red-sensitive layer on a transparent electrode on the inside of the plate 2', which in this case is made of a material permeable for infra-red light. The infra-red-sensitive layer consists of a substance giving off electrons, when subjected to infra-red irradiation. The layer may in this case be made continuous, and determines the ignition-moments of the glow-light for each phase.

Fig. 7 shows a device in which the infra-red-sensitive layer forms a cathode or a cathode-grating in a vacuum cell. 2' and 3 denote the walls of the discharge-chamber, 4 and 5 respectively a hot-cathode and a fluorescent anode, 14 the grid, which by means of the wires 9 is in connection with the grating-shaped anode 41 of the photo-electric cell. 42 denotes the network-formed cathode of the photo-cell, which cathode is provided with a photo-electric coating sensitive to infra-red light. In front of the cathode 42 there is placed an auxiliary cathode 43, which can be made, for example, as a transparent layer on the inner side of the glass plate 44, or may be a network, as indicated in the drawings. The auxiliary cathode, like the main cathode, is furnished with a photo-electric coating, sensitive to infra-red light. Between the cathodes 43 and 42 is arranged an electric field. When a point on the auxiliary or activating cathode 43 is struck by active infra-red light, there will at that point be emitted electrons, which simultaneously with their liberating ray of light, which passes through the cathode 43, will strike upon the corresponding point on the main cathode 42, where the effects of the electron-bombardment and of the irradiation are added to each other. It has been found that, when a photo-electric substance is at the same time exposed to active irradiation with light-waves and to bombardment with electrons, this electron-bombardment reduces the liberating action of the photo-electric substance. The practical effect of this is that the spectral-sensitivity of the substance is extended, i. e., the substance is activated towards longer waves, whereby an increased emission of electrons is attained.

The stream of electrons which now moves from the cathode 42 towards the cell-anode 41 can on their way be strengthened by inserting into the path of the electrons one or more bodies 45 emitting secondary electrons. These bodies are made of conductive material and are given by degrees suitably selected voltages, which occasions a maximum emission of secondary electrons. They can be made in the same way as the cathode, as above described, or as thin membranes, and impregnated with substances that easily emit secondary electrons, for example, oxides of rare earths. In the figure there is shown a source of supply of direct current 46, which serves to maintain a suitable difference of potential between the hot-cathode 4 in the discharge-chamber and the auxiliary cathode 43 of the vacuum cell. The main cathode 42 and the auxiliary electrode 45 in the vacuum cell can by means of sliding-contacts in connection with the potentiometer 47 be given suitable potentials. The grid-leak 15 is likewise connected with a sliding contact for adjustment of the voltage. 48 denotes a source of direct current, serving to maintain a suitable discharge voltage in the discharge-chamber.

Fig. 8 shows an appliance provided with an optic system, by aid of which is obtained an optical-electric intensification of the visible picture. In this device the discharge-container is placed in a box 49, at one end of which, in relation with the container, is placed a lens 50. 51 shows diagrammatically an object from which only infra-red rays enter the apparatus. By aid of the lens 50 an infra-red picture 52 of the object is thrown on the photo-electric layer sensitive to infra-red light in the container. This is converted in a manner similar to that before described to a visible picture 53, which by means of a lens 54 is thrown in enlarged or reduced form on an opaque disc 56. Before the lens 50 there can, if desired, be placed a light-filter 57. Beside the lens 54 there is a lens 58, which forms part of an optical system, embracing a number of prisms 59 and lenses 60, 61, the latter of which is on the same side of the container 1 as the lens 50. The optical system is so arranged that by aid of the lens 61 there is thrown a secondary visible picture on the layer sensitive to infra-red light, all points of which secondary picture coincide exactly with the primary infra-red picture. This will release a supplementary current, which will be added to the current primarily issuing from the infra-red picture. This process will be constantly repeated and will form an infinite series of increasing powers of the ratio: supplementary current/primary current. If this ratio becomes greater than unity, the series will become divergent and there will arise a self-activation independent of the infra-red irradiation. The reaction irradiation must therefore be regulated, for example by means of a shutter or diaphragm 62.

The amplifying effect attained by use of grid-control can be augmented by coupling several grids in a stepped series. A form of execution with two amplifying grids is shown in Fig. 9. Here 1 and 1' indicate the two discharge-chambers coupled in series, 2' indicates the left wall of the first chamber, 3 the partition between the two chambers and 3' the right wall of the other chamber. 4 and 4' indicate the cathodes of the two chambers and 5 and 5' their anodes, of which the latter is made fluorescent, while the former is given the form of a grating-formed layer on the left side of the partition 3, which layer by aid of thin wires 9' is connected in electrically with the directing grid 60' of the other chamber. The grid 60a in the first chamber is by means of the wires 9 in connection with the grating-formed anode 61 in the vacuum cell 62', on the cathode 63 of which is laid the photoelectric layer, sensitive to infra-red light.

64 indicates a source of direct current, of which the negative pole is connected with the cathode 63 of the photo-cell and the positive pole with the fluorescent anode 5'. Between the poles of the source of current is arranged a resistance 65, which acts as potentiometer for the cathodes 4 and 4', which by means of sliding-contacts can be given increased voltage relatively to the grids 60a and 60'.

The cathodes 4 and 4' and the grids 60a and 60' are in the form of execution shown in Fig. 9 intended to be furnished with photo-electric coatings emitting electrons, so that the liberation of electrons both by the anode current and the grid current can be effected by means of irradiation from a source of light 66, preferably emitting infra-red light. The source of rays can conveniently be given the form of an edging, running around the image-field and having a parabolic cross-section, in the focus-line of which the filament is placed. In this case the grating-plate 3 is made of a material transparent for infra-red light, and the anode-grating 5 is constructed with a reduced area of partial anodes, which may consist only of the wires 9', or be made of transparent coatings. With the form of execution shown in Fig. 9 there will in the first chamber be obtained a negative "electric picture", which in the second stage will be inverted to form a positive picture.

The expression "negative electric picture" denotes an invisible electric picture which would come out as a visible negative picture, if a fluorescent screen were introduced instead of the anode 5.

In those cases where the form of execution of the cell-grating is similar to that shown in Fig. 9, but with only one grid-stage, the direction of the current through the cell-grating can conveniently be inverted, in order to obtain a positive picture already in the first stage.

The mode of action of the appliance will be understandable without detailed description. The stream of electrons from the cathode 4 is controlled by aid of the grid 60a according to the intensity of irradiation to the corresponding points of the infra-red picture, which by means of a lens is thrown upon the cathode 63 of the photo-cell. The stream of electrons plus the grid-current passes through the anode 5 of the amplifying stage and effects by aid of the grid 60' the controlling of the discharge current from the cathode 4'. As the grid-current of the second stage consists of the anode-current of the first stage plus the grid-current, the intensity of irradiation, or the ratio between the areas or the degrees of effect of the infra-red-sensitive substance in both stages must be made such that voltages of the stages adjust themselves in a favourable ratio, only their sum total being determined by the outer terminal voltages.

The grating-plates 2' and 3 can also be made like the plate 2' in Fig. 7. Both plates can in such case be of quite identical form, each of them consisting of material impermeable for visible and infra-red light.

The photo-electric sensitive layer need not necessarily be divided up in the form of a grating. It may for example have the form of a continuous layer on the inside of a transparent electrode, placed on the inside of the plate 2', which in this case is made of a material permeable for infra-red light. Figure 11 shows such a form of a device according to the invention. On this figure, 2 and 3 designate the walls of the discharge chamber, both being made of material permeable to infrared and visible light. On the inside of the wall 2 a transparent electrode 73 is placed covered with a layer 74 of a substance the electrical resistance of which diminishes when subjected to the irradiation with infrared light. The layer 74 is shown divided into a grating, this being however not necessary. Over this layer is placed a semi-conductive coating 75, impermeable to infrared light and on this a conductive grating formed layer 76, acting as a grid and covered with a photoelectric, emitting substance which serves as grid discharger.

Fig. 10 shows in section how an apparatus according to the invention can be executed in practice. 68 and 69 denote two parallel plates corresponding to the plates 2 and 3. These plates are at the lower end fastened to a footpiece 70. Between the plates is shown a grooved grating 71, similar, for instance, to the grating 29 in Fig. 6. The apparatus is put together in such a manner that the plates 68 and 69 together with the grating 71 and the necessary electrodes are fastened to the footpiece 70 and the whole inserted into the container 72, which is thereupon evacuated and closed by welding. All the forms of execution shown in the drawings can be performed in a similar manner.

In order to secure a sharp reproduction of the half-tones of the picture, there can, with a view to influencing the paths of the electrons, be introduced one or more magnetic fields for electromagnetic portrayal of the electron-emitting surface, according to the methods known from electron-optics. For example, there can be employed a magnetic field whose lines of power are so directed that the electrons are forced to move in paths approximately perpendicular to the surface of the picture.

In Fig. 10 a coil 77 is indicated, for producing such an electromagnetic field.

In the vicinity of the cathode there can in some cases be arranged space-charge grids.

In order to avoid the risk that on use of a fluorescent screen of possibly imperfect conductive capacity there might occur displacement in the paths of the electrons, and consequent distortion of the image owing to possible static currents on the screen, there can be placed immediately in front of the screen a net-formed auxiliary anode, which moreover can also be brought into direct contact with the fluorescent screen.

The electrode in the above described forms of execution can be made in the form of network or as permeable layers or membranes.

In the forms of execution where there occurs a heating of the cell-grating, for example, from incandescent wires, a cooling-device for cell-grating may be employed, where this is found advantageous.

As material for the lenses and the transparent surfaces there can, according to the spectral field utilized, be employed glass, quartz, fluor-spar or other substances permeable for infra-red rays. If the objective also is permeable for visible light, there may be arranged before or behind the objective a suitable filter which absorbs the visible rays.

The terms "infra-red-sensitive layer" and "photo-electric layer sensitive to infra-red light" used in this specification comprise, as will be understood, all kinds of substances which may be used in photoelectric cells sensitive to infra-red light. Substances such as selenium or sulfide of thallium, the electrical resistance of which diminishes when irradiated with visible and infra-red light may be used, preferably in form of a layer divided into a grating and covered with a common transparent metallic electrode. Instead of such substances composite layers may be used, consisting of two substances as for instance Cu and $Cu_2O$, the electrical resistance of the limit surface between the two substances being dependent on the visible or infra-red irradiation. Further substances may be used which give off electrons in accordance with the visible and infra-red irradiation when placed on a cathode in an evacuated or gas-filled container. In this case the anode is preferably divided into a grating, the elements of which being connected with the grid-elements controlling the discharge in the discharge-chamber.

The infra-red sensitive layer upon which the primary image is projected is for the sake of simplicity designated in the claims by the expression "image carrier".

I wish it to be understood that I do not desire to be limited to the exact details of construction shown and described, for obvious modifications will occur to a person skilled in the art.

I claim:

1. Apparatus of the kind described, comprising in combination an electrical discharge chamber, two substantially plane electrodes in the said chamber between which there may take place a discharge, means to give the said electrodes suitable potentials for producing such a discharge, an image carrier having a substantially plane surface upon which an image may be projected, means to project an infrared image upon the said surface, means for producing an electric field whose lines of force cut the image plane, a substance or substances in the image carrier in which substance or substances the infrared irradiation will release a number of electrons corresponding to the intensity of irradiation, which electrons are conducted away from the image carrier by influence of the said electric field, a third electrode in the discharge chamber, the projection of which upon a plane in parallel with the first named electrodes consists of elements evenly distributed across the plane, means for connecting the different elements of said third electrode to the corresponding elements of the image carrier in such a way that the said released electrons will effect a charging of the said electrode elements corresponding to the intensity of the infrared irradiation of the different elements of the image carrier, whereby the discharge between the first named electrodes is controlled by means of the third electrode in accordance with the said infrared image, means to conduct away the electric charges from the third electrode, a substance or substances in the discharge chamber in which substance or substances the discharge may produce a visible image corresponding to the infra-red image, and means for protecting the image carrier against diffused irradiation from the visible image.

2. Apparatus of the kind described comprising in combination an electrical discharge-chamber, two substantially plane electrodes in said chamber between which a discharge takes place, a third electrode in the said chamber adapted to act as a grid, and comprising a number of elements arranged in form of a grating, a plate on the one side of the said chamber made of a material impermeable for visible and infrared light, a number of metal wires corresponding to the number of grid elements and being on the inside of the plate connected with the grid elements, a number of elements on the outside of the said plate each element being connected with one of the said wires, the said metallic elements forming the one electrode in a photoelectric cell, means adapted to conduct away the electrical charges on the grid electrode, means to give the electrodes suitable potentials, means to throw an infrared image upon one of the electrodes in the photoelectric cell, and a substance or substances in said chamber, in which substance or substances the discharge produces a visible image.

3. Apparatus of the kind described, comprising in combination an electrical discharge chamber, a plate on one side of said chamber made of a material permeable for infrared rays, a transparent metal sheeting on the inside of the said plate, a layer on the said metal sheeting consisting of a substance or substances the electrical resistance of which depends on the intensity of the infrared irradiation of the substance or substances, a coating impermeable for visible and infrared light on the said layer, a layer of a substance which easily gives off electrons on the inside of the said coating, a cathode arranged in the vicinity of the said plate, an anode arranged in parallel with the said cathode, means for giving the transparent metal sheeting, the anode and the cathode desired potentials, means adapted to throw an infrared image upon the layer on the transparent metal sheeting, and a substance or substances in said chamber in which substance or substances the discharge may produce a visible image.

4. Apparatus as claimed in claim 2, wherein the elements forming the one electrode of the photocell are made of a substance or substances, the electrical resistance of which diminishes when it is irradiated with infrared light, and wherein the other electrode of the photocell consists of a transparent metal sheeting covering the said elements of the first electrode.

5. Apparatus of the kind described, comprising in combination an electrical discharge chamber, two substantially plane electrodes in said chamber, between which a discharge may take place, a substance or substances in the said chamber in which substance or substances the discharge may produce a visible image, a number of electrically conducting elements arranged in form of a grating in the said chamber, and adapted to act as a grid, a plane plate on the one side of the said chamber made of a material impermeable for visible and infrared light, a number of metal wires corresponding to the number of grid elements, which wires pass right through the said plate and being connected with the corresponding grid elements, a second discharge chamber on the outside of the said plate adapted to act as a photo-electric cell-grating, a metallic layer on the outside of the plate, being divided up into a grating, the grating elements being in electrical connection with the outer ends of the said wires, a plane electrode in the second discharge chamber, a coating of a substance which emits electrons when being irradiated with infrared light, being placed on one of the electrodes in the said second discharge chamber, which electrode is adapted to act as a cathode, means adapted to conduct away the charges of the grid elements, means to give the two electrodes in the first named discharge chamber, and the plane cathode in the second discharge chamber desired potentials, a current system comprising a source of current adapted to produce a discharge between the electrodes in the two discharge chambers and means to throw an infrared image upon the said plane cathode.

6. Apparatus as claimed in claim 2, wherein the means for conducting away the electrical charges on the grid electrode consists of an electrically conducting layer on the inside of the said plate.

7. Apparatus as claimed in claim 2, wherein the means for conducting away the electrical charges on the grid electrode consists of a coating of an easily electron-emitting substance on the grid elements.

8. Apparatus as claimed in claim 2, wherein the grid elements consist of the ends of the said wires, projecting into the discharge chamber.

9. Apparatus as claimed in claim 2, wherein the means for conducting away the electrical charges on the grid electrode consists of a coating on the grid elements, said coating comprising a substance which emits electrons when being irradiated with infrared light.

10. Apparatus as claimed in claim 2, wherein the means for conducting away the electrical charges on the grid electrode consist of a coating on the grid elements, said coating comprising a substance which emits electrons when being irradiated with infrared light, and wherein one of the first named electrodes is made as a hot cathode and adapted to effect the electron emission from the grid elements.

11. Apparatus as claimed in claim 2, wherein the grid elements consist of the ends of the said wires, projecting into the discharge chamber, said ends being coated with a substance emitting electrons when being irradiated with infrared light.

12. Apparatus as claimed in claim 2, wherein the means for conducting away the electrical charges on the grid electrode consist of a coating on the grid elements, said coating comprising a substance which emits electrons when being irradiated with infrared light, and means comprising a separate source of infrared rays adapted to effect the electron emission from the grid elements.

13. Apparatus as claimed in claim 1, wherein the anode is provided with a coating of fluorescent substance and an additional auxiliary anode is arranged in front of the fluorescent anode.

14. Apparatus as claimed in claim 5, comprising the arrangement of an auxiliary cathode in the vicinity of the main cathode in the second discharge chamber, which auxiliary cathode is provided with a coating of a substance which emits electrons when being irradiated with infrared light, and which auxiliary cathode is given a higher negative potential than the cathode.

15. Apparatus as claimed in claim 5, comprising the arrangement of one or more auxiliary electrodes between the cathode in the second discharge chamber and the said plate which electrodes being impregnated with substances emitting secondary electrons when being struck by primary electrons.

16. Apparatus as claimed in claim 5, comprising an auxiliary cathode placed in immediate vicinity of the main cathode in the second discharge chamber, which auxiliary cathode is provided with a coating of substance which emits electrons when being struck by primary electrons and which electrode has a light-reflecting surface.

17. Apparatus as claimed in claim 1, refracting and reflecting means for leading some of the light emanating from the visible image back to the photo-electric cell in such a manner that there is formed a secondary image, the pictoral points of which coincide exactly with the corresponding points in the primary infrared picture.

18. Apparatus as claimed in claim 1, comprising refracting and reflecting means for leading some of the light emanating from the visible image back to the photo-electric cell in such a manner that there is formed a secondary image, the pictoral points of which coincide exactly with the corresponding points in the primary infrared picture, comprising further a diaphragm with an adjustable aperture for regulating.

19. Apparatus as claimed in claim 1, comprising a partition wall arranged between the first named two electrodes and dividing the said discharge chamber into two sections, a number of metal wires passing right through the said wall, for conducting the discharge through the said wall a number of metallic elements on one side of said wall, each being connected to one of the said wires, said metallic elements acting as anode elements, a number of elements on the other side of the said wall each being connected to one of the said wires, said last named elements acting as grid elements, an electrode on the same side of the said wall as the said grid elements acting as a cathode, means to conduct away the charges on the last named grid elements, and means adapted to give the electrodes in the discharge chamber suitable potentials.

20. Apparatus according to claim 1, wherein in the immediate vicinity of the grid there is arranged an electrically conductive layer adapted to act as charging-condenser for the grid.

21. Apparatus according to claim 1, wherein in the immediate vicinity of the grid there is arranged an electrically conductive layer adapted to act as charging-condenser for the grid, and in which one of the electrodes in the discharge chamber is placed in the vicinity of the grid and provided with a coating of a substance reducing the potential gradient of the said electrode when it acts as a discharge cathode.

22. Apparatus as claimed in claim 1, comprising an electro-magnetic coil surrounding the discharge chamber for producing an electro-magnetic field, adapted to force the electrons to move in the direction of the lines of power.

LARS JÖRGEN ORVIN.